C. M. SWINGLE.
VEHICLE SUSPENSION.
APPLICATION FILED APR. 12, 1918.

1,289,956.

Patented Dec. 31, 1918.
2 SHEETS—SHEET 1.

Witness

Inventor
C. M. Swingle,
By C. A. Snow & Co.
Attorneys

C. M. SWINGLE.
VEHICLE SUSPENSION.
APPLICATION FILED APR. 12, 1918.
1,289,956.
Patented Dec. 31, 1918.
2 SHEETS—SHEET 2.
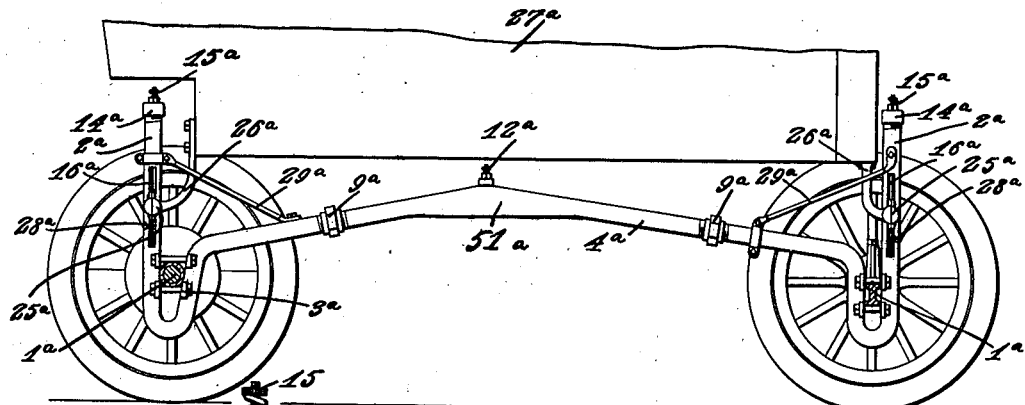
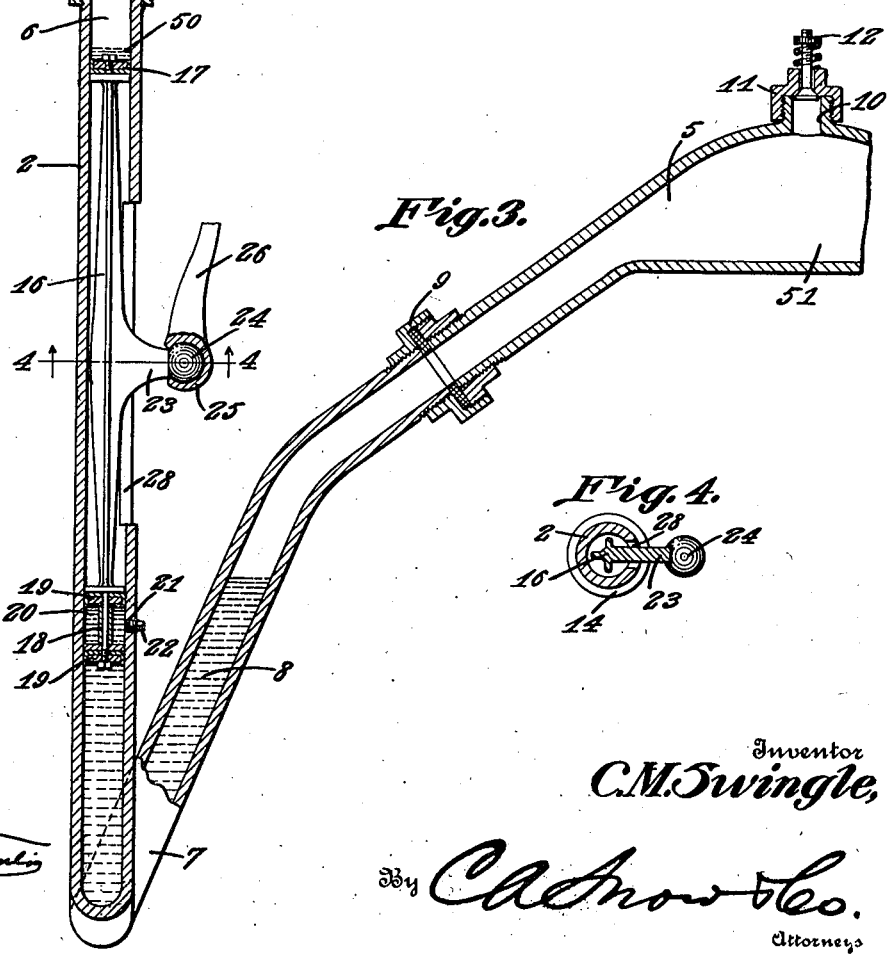

UNITED STATES PATENT OFFICE.

CHARLES M. SWINGLE, OF CLEVELAND, OHIO.

VEHICLE SUSPENSION.

1,289,956.  Specification of Letters Patent.  Patented Dec. 31, 1918.

Application filed April 12, 1918. Serial No. 228,225.

*To all whom it may concern:*

Be it known that I, CHARLES M. SWINGLE, a citizen of the United States, residing at Cleveland, in the county of Cuyahoga and State of Ohio, have invented a new and useful Vehicle Suspension, of which the following is a specification.

It is the object of this invention to provide a novel means whereby by the use of compressed air and bodies of liquid, a vehicle body may be suspended yieldingly from the running gear of the vehicle.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings:—

Fig. 3 is a vertical section taken through the conduit;

Fig. 4 is a cross section taken approximately on the line 4—4 of Fig. 3; and

Fig. 5 is a longitudinal section showing a modification, most of the parts shown appearing in elevation.

Figure 1:
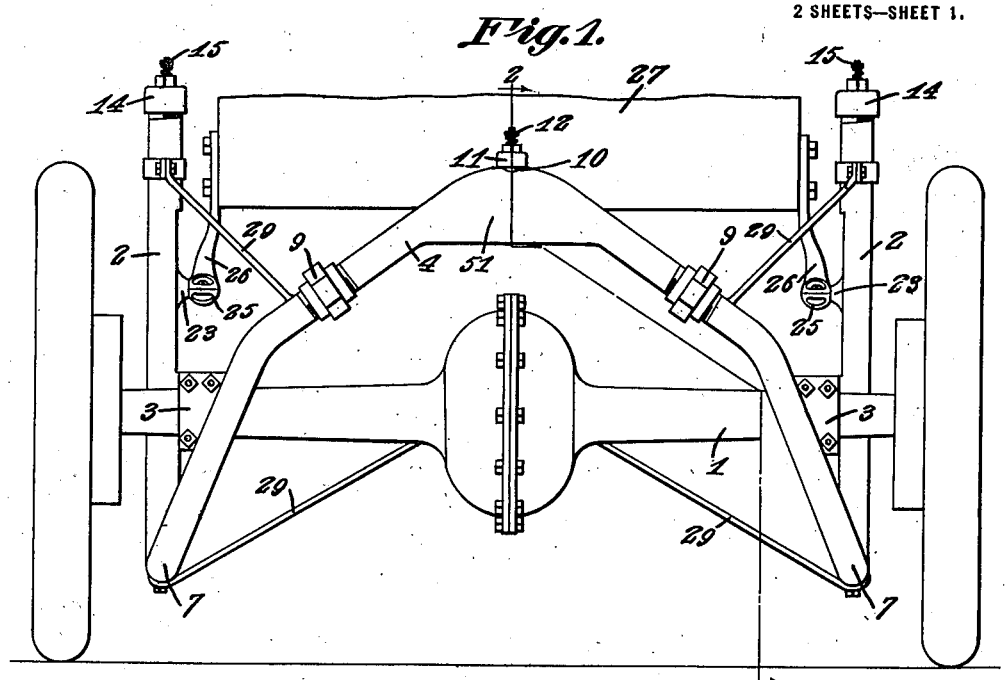
Figure 1 shows in rear elevation, a portion of a vehicle embodying the device forming the subject matter of this application.
Figure 2:
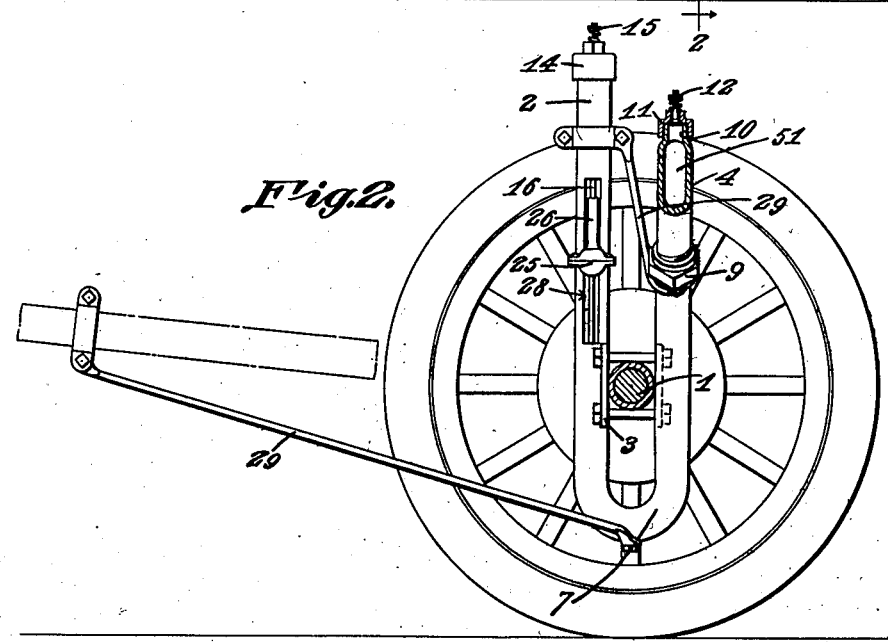
Fig. 2 is a section taken approximately on the line 2—2 of Fig. 1.

Referring to Figs. 1 to 4 both inclusive, the numeral 1 marks the axle of a vehicle. There is provided a conduit comprising upright arms 2 secured by means of clips 3 to the axle 1, the conduit including a crown 4, the top of which forms a first air trap 5. As shown at 51 the crown 4 may be enlarged to form an air reservoir. The upper ends of the arms 2 form second air traps. The lower ends of the arms 2 coöperating with the lower ends of the crown 4 define cushion traps 7 in which are located bodies of liquid 8, preferably oil. If desired, the crown 4 of the conduit may include a removable central section held in place by couplings 9. The top of the crown 4 is supplied with a nipple 10 on which is removably mounted a cap 11 carrying a release valve 12 under the control of an operator. Caps 14 are mounted on the upper ends of the arms 2 and carry release valves 15 under the control of an operator.

Plungers 16 are mounted to reciprocate in the arms 2, each plunger carrying at its upper end, a piston 17 working in the upper end of the arm 2 and coacting with the air trap 6. A small quantity of oil shown at 50 may be placed on top of the piston 17 to serve as a seal. On the lower end of each plunger 16 there is a piston 18 embodying spaced heads 19, between which a body of sealing liquid 20 preferably oil, is located. This body of sealing liquid 20 may be inserted between the heads 19 through a hole 21 in the arm 2, the hole being closed by a removable plug 22 or in any other suitable manner. There are vertical slots 28 in the arms 2, in which work brackets 23 formed integrally or connected to the plungers 16, the brackets carrying balls 24 received in sockets 25 on hangers 26 connected with a vehicle body 27.

When the vehicle body 27 moves upwardly and downwardly, motion will be transmitted to the plungers 16. The pistons 17 will be cushioned against upward movement by the air in the traps 6, the piston 18 being cushioned with respect to downward movement, by the body 8 of liquid in the trap 7, the bodies of liquid being adapted to rise in the central air trap 5, and to compress the air in the central air trap. It is possible to manipulate the valves 15 to let a part of the air out of the traps 6, and the valve 12 may be manipulated to let a part of the air out of the trap 5, in order to position the vehicle body 27 properly. Further, when it is desired to fill the space between the heads 19 of the lower piston 18 with the sealing liquid 20, air may be permitted to escape, as aforesaid, so that the sealing liquid can be inserted through the hole 21 when the plug 22 is removed. Air may be pumped in through the valves 15, and the same observation holds true with respect to the valve 12. The conduit may be braced in any suitable manner as indicated at 29.

In Fig. 5 of the drawings, a slight modification of the invention is shown. In Fig. 5, parts hereinbefore described are designated by numerals previously used, with the suffix "a." In Fig. 1 of the drawings, the conduit extends transversely of the vehicle and is assembled with a single axle, whereas, in Fig. 5, the conduit extends longitudinally of the vehicle.

Having thus described the invention, what is claimed is:—

1. In a vehicle suspension, a conduit comprising upright axle-carried arms and a crown connecting the arms, the top of the crown forming a first air tap and the upper ends of the arms forming second air traps, the lower ends of the arms and the lower ends of the crown defining cushion traps; bodies of liquid in the cushion traps; plungers in the arms, the plungers embodying upper pistons operating in the second air traps and lower pistons supported on the bodies of liquid; and means for connecting the plungers with a vehicle body.

2. A device constructed in accordance with claim 1, and further characterized by the provision of a release valve in the top of the crown.

3. A device of the class described constructed in accordance with claim 1, and further characterized by release valves in the upper ends of the arms.

4. A device constructed in accordance with claim 1 and further characterized by the provision of a release valve located in the top of the crown, and by the provision of release valves located in the upper ends of the arms.

5. A device of the class described, constructed as set forth in claim 1, and further characterized by the fact that the lower pistons comprise spaced heads, there being a liquid seal between the heads, the arms having openings permitting the introduction of the seal, and closures for the said openings.

In testimony that I claim the foregoing as my own, I have hereto affixed my signature in the presence of two witnesses.

CHARLES M. SWINGLE.

Witnesses:
 GEO. J. SPENCE,
 H. S. WILLEY.